United States Patent [19]

Sakashita et al.

[11] Patent Number: 5,550,205
[45] Date of Patent: Aug. 27, 1996

[54] COPOLYCARBONATES AND MANUFACTURING METHOD FOR THEM

[75] Inventors: Takeshi Sakashita, Moka; Tomoaki Shimoda, Iwakuni; Takashi Nagai, Moka, all of Japan

[73] Assignee: General Electric Company, Pittsfield, Mass.

[21] Appl. No.: 342,987

[22] Filed: Nov. 21, 1994

[30] Foreign Application Priority Data

Nov. 26, 1993 [JP] Japan .................................. 5-319281

[51] Int. Cl.$^6$ .............................................. C08G 63/00
[52] U.S. Cl. ..................... 528/176; 528/180; 528/182; 528/194; 528/195; 528/196; 528/202; 528/260
[58] Field of Search ................................. 528/260, 176, 528/180, 182, 194, 195, 196, 202; 525/461, 462

[56] References Cited

U.S. PATENT DOCUMENTS

4,628,081  12/1986  Mark et al. ........................... 528/176

*Primary Examiner*—Morton Foelak
*Assistant Examiner*—Richard Jones

[57] ABSTRACT

To provide novel polycarbonates and a manufacturing method for them.

Copolycarbonates obtained by copolymerizing at least two aromatic dihydroxy compounds and a compound capable of introducing carbonate links. Preferably, they contain, as the components derived from the aromatic dihydroxy compounds, constituent units described by formulas [I] and [II] in proportions of from $8\times10^{-5}$ to $3\times10^{-2}$ moles of [II] per mole of [I], and preferably they have a limiting viscosity number [η] of from 0.2 to 1.2 dL/g, as measured in methylene chloride at 20° C.

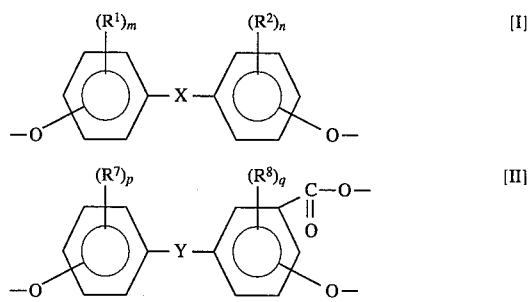

(X, Y,: Alkylene, cycloalkylene, —O—, —S—, —SO—, OR —SO$_2$—. R$^1$, R$^2$, R$^7$, R$^8$: hydrocarbon group with from 1 to 10 carbon atoms which may be substituted with halogen; or a halogen atom. m, n, p: Integers ranging from 0 to 4, indicating the number of substituents. q: Integer ranging from 0 to 3, indicating the number of substituents. R$^6$: Straight-chain, branched, or cyclic hydrocarbon group with from 1 to 20 carbon atoms which may be substituted with hydrogen atoms or halogen; or a halogen atom).

Manufacturing method for said copolycarbonates in which the aromatic dihydroxy compounds and carbonic acid diesters are melt-polycondensed in the presence of an alkali metal or alkaline earth metal catalyst.

The copolycarbonates of the invention have excellent melt elasticity and melt strength as well as excellent hue, heat resistance, moisture resistance, and transparency.

11 Claims, 3 Drawing Sheets

COPOLYCARBONATES AND MANUFACTURING METHOD FOR THEM

Copolycarbonates having excellent melt elasticity and melt strength as well as excellent hue, heat resistance, moisture resistance, and transparency are provided by the present invention.

The present invention concerns copolycarbonates. More specifically, it concerns branched copolycarbonates and a manufacturing method for them.

Polycarbonates are widely used because of their excellent mechanical properties such as impact strength as well as their excellent heat resistance and transparency.

Commonly known polycarbonates are manufactured using bisphenol A as the dihydroxy component and have a molecular structure with a bisphenol A backbone.

However, polycarbonates having this type of linear molecular structure sometimes have poor melt elasticity, melt strength, or the like in melt molding, and an improvement in such molding properties is desired. It is generally known how to provide polycarbonates with branches by copolymerization with polyfunctional compound(s) as a method of improving such molding properties (Unexamined Japanese Patent Application Disclosure Tokkai No. Hei 4-89824).

Thus, the object of the present invention is to provide novel branched copolycarbonates with excellent molding properties such as melt elasticity and melt strength as well as excellent heat resistance, moisture resistance, and hue stability.

Another object of the present invention is to provide a manufacturing method for the said polycarbonates.

First, the present invention provides copolycarbonates characterized by the fact that copolycarbonates obtained by copolymerizing at least two aromatic dihydroxy compounds and a compound capable of introducing carbonate links are improved by the fact that they contain, as (1) the components derived from the aromatic dihydroxy compounds, a constituent unit described by the following formula [I]

(in this formula, X is —($R^3$—)C(—$R^4$)—, —C(=$R^5$)—, —O—, —S—, —SO—, or —$SO_2$— {where $R^3$ and $R^4$ are monovalent hydrocarbon groups which may be substituted with hydrogen atoms or halogens, and $R^5$ is a bivalent hydrocarbon group which may be substituted with halogen}; $R^1$ and $R^2$, which may be identical or different, are each a hydrocarbon group with from 1 to 10 carbon atoms which may be substituted with halogen or are a halogen atom; and m and n are independently integers ranging from 0 to 4 and representing the number of substituents) and a constituent unit described by the following formula [II]

(in this formula, Y is —($R^{3'}$—)C(—$R^{4'}$)—, —C(=$R^{5'}$)—, —O—, —S—, —SO—, or —$SO_2$— {where $R^{3'}$ and $R^{4'}$ are monovalent hydrocarbon groups which may be substituted with hydrogen atoms or halogen, and $R^{5'}$ is a bivalent hydrocarbon group which may be substituted with halogen}; $R^7$ and $R^8$, which may be identical or different, are each a hydrocarbon group with 1 to 10 carbon atoms which may be substituted with halogen or halogen atom; and p and q represent the number of substituents, with p being an integer ranging from 0 to 4 and q being an integer ranging from 0 to 3).

The present invention also provides copolycarbonates for which it is particularly preferred that (1) they contain, as the components derived from the aromatic dihydroxy compounds, from $8 \times 10^{-5}$ to $3 \times 10^{-2}$ moles of the constituent unit described by formula [II] per mole of the constituent unit described by formula [I], and

(2) they have a limiting viscosity number [η] of from 0.2 to 1.2 dL/g, as measured in methylene chloride at 20° C.

In said formula [I], X is —($R^3$—)C(—$R^4$)—, —C(=$R^5$)—, —O—, —S—, —SO—, or —$SO_2$— {where $R^3$ and $R^4$ are straight-chain, branched, or cyclic monovalent hydrocarbon groups having from 1 to 15 carbon atoms which may be substituted with hydrogen atoms or halogen, and $R^5$ is a straight-chain, branched, or cyclic bivalent hydrocarbon group with 1 to 15 carbon atoms which may be substituted with halogen}; $R^1$ and $R^2$, which may be identical or different, are each a straight-chain, branched, or cyclic hydrocarbon group with 1 to 10 carbon atoms which may be substituted with halogen or are a halogen atom, and m and n are defined as above. In said formula [II], Y is —($R^{3'}$—)C(—$R^{4'}$)—, —C(=$R^{5'}$)—, —O—, —S—, —SO—, or —$SO_2$— {where $R^{3'}$ and $R^{4'}$ are straight-chain, branched, or cyclic monovalent hydrocarbon groups with from 1 to 15 carbon atoms which may be substituted with hydrogen atoms or halogen, and $R^{5'}$ is a straight-chain, branched, or cyclic bivalent hydrocarbon group with from 1 to 15 carbon atoms which may be substituted with halogen}; $R^7$ and $R^8$, which may be identical or different, are each a straight-chain, branched, or cyclic hydrocarbon group with from 1 to 10 carbon atoms which may be substituted with halogen or are a halogen atom; and p and q are defined in the same manner as hereinabove.

It is especially preferred that X in the said formula [I] be a straight-chain or branched alkylene and that Y in said formula [II] be a straight-chain or branched alkylene.

The copolycarbonates of the invention contain the constituent units respectively described by the above-mentioned formulas [I] and [II] as the constituent units derived from aromatic dihydroxy compounds.

Among such aromatic dihydroxy compounds, those described by, for example, the following formula [III]:

(where X, $R^1$, $R^2$, m and n are defined as above) can be used for introducing the constituent unit described by the above-described formula [I]. Examples of monovalent hydrocarbon groups include straight-chain, branched, or cyclic alkyl groups, alkenyl groups, aryl groups (for example, phenyl groups), alkaryl groups (for example, tolyl groups), and aralkyl groups (for example, benzyl groups). Preferred monovalent hydrocarbon groups include alkyl groups and aryl groups with 1 to 6 carbon atoms. Examples of bivalent hydrocarbon groups are the bivalent forms of these monovalent groups with one more free valences. The following aromatic dihydroxy compounds are specific examples of this type of compound:
bis(hydroxyaryl)alkanes such as bis(4-hydroxyphenyl) methane, 1,1-bis(4 -hydroxyphenyl)ethane, 2,2-bis(4-hydroxyphenyl)propane(known as bisphenol A), 2,2 -bis(4-hydroxyphenyl)butane, 2,2-bis(4-hydroxyphenyl)octane, bis(4 -hydroxyphenyl)phenylmethane, 2,2-bis(4-hydroxy-3-methylphenyl)propane, 1,1-bis(4 -hydroxy-3-t-butylphenyl) -propane, 2,2-bis(4 -hydroxy-3-bromophenol)propane, and 2,2-bis(4 -hydroxy-3,5-dimethylphenyl)propane; bis(hydroxyaryl)cycloalkanes such as 1,1-bis(4 -hydroxyphenyl) cyclopentane and 1,1-bis(4-hydroxyphenyl)cyclohexane;dihydroxyaryl ethers such as 4,4'-dihydroxydiphenyl ether and 4,4'-dihydroxy-3,3'-dimethylphenyl ether, dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Of these 2,2-bis(4-hydroxyphenyl)propane is especially preferred.

Aromatic dihydroxy compounds described by, for example, general formula [IV].

(where Y, $R^7$, $R^8$, p and q are defined as above; $R^6$ is a straight-chain, branched, or cyclic hydrocarbon group with 1 to 20 carbon atoms which may be substituted with hydrogen atoms or halogen or is a halogen atom) can be used for introducing the constituent unit described by above-mentioned formula [II]. Specific examples of this type of compound include aromatic dihydroxy compounds such as the following: 2-(4-hydroxyphenyl)-2-(3'-carboxyl-4'-hydroxyphenyl)propane, 2-(4-hydroxyphenyl)-2-(3'-methoxycarbonyl-4'hydroxyphenyl)propane, 2-(4-hydroxyphenyl)-2-(3'-ethoxycarbonyl-4'-hydroxyphenyl)propane, 2-(4-hydroxyphenyl)-2-(3'-butoxycarbonyl-4'-hydroxyphenyl)propane, 2-(4-hydroxyphenyl)-2-(3'-phenoxycarbonyl-4'-hydroxyphenyl)propane, 2-(4-hydroxyphenyl)-2-(3'-phenoxycarbonyl-4'-hydroxyphenyl)methane, 2-(4-hydroxyphenyl)-2-(3'-phenoxycarbonyl-4'-hydroxyphenyl)ethane, 2-(4-hydroxyphenyl)-2-(3'-phenoxycarbonyl-4'-hydroxyphenyl)octane, 1-(4-hydroxyphenyl)-1-(3'-phenoxycarbonyl-4'-hydroxyphenyl)cyclopentane, 4-hydroxyphenyl-3'-phenoxycarbonyl-4'-hydroxyphenyl ether, 4-hydroxyphenyl-3'-phenoxycarbonyl-4'-hydroxyphenyl sulfide, 4-hydroxyphenyl-3'-phenoxycarbonyl-4'-hydroxyphenylsulfoxide, and 4-hydroxyphenyl-3'-phenoxycarbonyl-4'-hydroxyphenyl sulfone.

Of these, 2-(4-hydroxyphenyl)-2-(3'-carboxy-4'-hydroxyphenyl)propane and 2-(4-hydroxyphenyl)-2-(3'-phenoxycarbonyl-4'-hydroxyphenyl)propane are especially preferred.

Such compounds can be easily synthesized by monocarboxylation of the desired aromatic dihydroxy compound using the Kolbe-Schmitt reaction and then optionally by esterification.

It is preferred for the copolycarbonates of the invention to contain the constituent unit described by [II] in proportions of $8 \times 10^{-5}$ to $3 \times 10^{-2}$ moles, more preferably $2.5 \times 10^{-4}$ to $1 \times 10^{-2}$ moles, most preferably $5 \times 10^{-4}$ to $5 \times 10^{-3}$ moles, per mole of the constituent unit described by [I]. At less than $8 \times 10^{-5}$ moles of the constituent unit described by [II], melt properties diminish, and at more than $3 \times 10^{-2}$ moles, melt viscosity is too-high, diminishing moldability.

The copolycarbonates of the invention contain carbonate links which can be introduced using phosgene, carbonic acid diesters, or the like. Specific examples of such carbonic acid diesters include the following types of compounds: diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate. Of these, diphenyl carbonate is especially preferred.

In addition to the constituent units described hereinabove, the copolycarbonates of the invention may contain constituent units derived from dicarboxylic acids or dicarboxylic acid esters. Examples of such dicarboxylic acids and dicarboxylic acid esters include the following types of compounds: terephthalic acid, isophthalic acid, sebacic acid, decanedioic acid, dodecanedioic acid, diphenyl sebacate, diphenyl terephthalate, diphenyl isophthalate, diphenyl decanedioate, and diphenyl dodecanedioate.

Polyester polycarbonates are obtained when this type of dicarboxylic acid or dicarboxylic acid ester is used in combination with carbonic acid diester. In the present invention, the dicarboxylic acid or dicarboxylic acid ester content can be no more than 50 moles, preferably no more than 30 moles, per 100 moles of carbonic acid diester.

The limiting viscosity number [η] of the copolycarbonates of the invention is from 0.2 to 1.2 dL/g, more preferably from 0.3 to 0.8 dL/g, as measured at 20° C. in methylene chloride (0.5 g/dL) with an Ubbelohde viscometer. If the limiting viscosity number falls below this range, mechanical strength diminishes, and if it exceeds this range, moldability diminishes.

The copolycarbonates of the invention have excellent hue with a yellow index (YI) of usually no more than 3, preferably no more than 2.5, as measured in the following manner. They also show very little discoloration.

YI values were obtained by measuring 3 mm thick press sheet samples of the copolycarbonate with a Nihon Denshoku Kogyo (KK) Color and Defference Meter ND-1001 DP, using the transmission method and then calculating the YI value by plugging the resultant X, Y, and Z values into the following equation.

$$YI = (100/Y) \times (1.277X - 1.060Z)$$

The copolycarbonates of the invention have excellent molding properties such as high melt elasticity and melt strength, which are clearly superior to polycarbonates not containing a constituent unit described by [II]. The copolycarbonates of the invention also have excellent hue and transparency.

The copolycarbonates of the invention can be manufactured by an interfacial polycondensation technique, using, for example, an aromatic dihydroxy compound described by the above-mentioned general formula [III], an aromatic dihydroxy compound described by the above-mentioned general formula [IV], and phosgene. However, it is preferred to use the manufacturing method described hereinbelow.

The present invention secondly provides a manufacturing method for the above-described copolycarbonates. Thus, the manufacturing method of the invention is characterized by the fact that an aromatic dihydroxy compound described by the following formula [III]

(where X, $R^1$, $R^2$, m and n are defined as above), an aromatic dihydroxy compound described by the following formula [IV]

(where Y, $R^6$, $R^7$, $R^8$, p and q are defined as above), and carbonic acid diester are melt-polycondensed in the presence of a catalyst (a) selected from among alkali metal compounds and alkaline earth metal compounds.

In the method of the invention, it is preferred to use the specific compounds previously listed as aromatic dihydroxy compounds described by general formula [III] and aromatic dihydroxy compounds described by general formula [IV].

The aromatic dihydroxy compound described by general formula [IV] is used in proportions of from $8\times10^{-5}$ to $3\times10^{-2}$ moles, preferably from $2.5\times10^{-4}$ to $1\times10^{-2}$ moles, more preferably from $5\times10^{-4}$ to $5\times10^{-3}$ moles, per mole of the aromatic dihydroxy compound described by general formula [III].

It is also preferred to use the compounds already specifically listed as carbonic acid diesters, of which diphenyl carbonate is preferred.

In the manufacturing method of the invention, it is preferred to use carbonic acid diesters such as those named hereinabove in amounts of from 1.0 to 1.30 moles, more preferably from 1.01 to 1.20 moles, most preferably from 1.01 to 1.10 moles, per mole of the total amount of aromatic dihydroxy compounds [III] and [IV] used.

In the manufacturing method of the invention, it is also possible to use dicarboxylic acids or dicarboxylic acid esters such as those mentioned hereinabove in amounts of no more than 50 moles, preferably no more than 30 moles, per 100 moles of carbonic acid diester.

In the manufacturing method of the invention, the various compounds, described hereinabove, are melt polycondensed in the presence of a catalyst (a) selected from among alkali metal compounds and alkaline earth metal compounds.

Preferred examples of such an alkali metal or alkaline earth metal compound to be used as a catalyst include, specifically, the organic acid salts, inorganic acid salts, oxides, hydroxides, hydrides, and alcoholates of alkali metals or alkaline earth metals.

More specific examples of alkali metal compounds that can be used include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylate, sodium benzoate, potassium benzoate, lithium benzoate, disodium hydrogen phosphate, dipotassium hydrogen phosphate, lithium hydrogen phosphate, and disodium salts, dipotassium salts, and dilithium salts of bisphenol A, as well as sodium salts, potassium salts, and lithium salts of phenol.

Specific examples of alkaline earth metal compounds include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

These compounds can be used singly or in combination.

This catalyst (a) selected from among alkali metal and alkaline earth metal compounds is used in amounts of preferably from $1\times10^{-8}$ to $1\times10^{-3}$ moles, preferably from $1\times10^{-7}$ to $1\times10^{-5}$ moles, most preferably from $1\times10^{-7}$ to $3\times10^{-6}$ moles, per mole of the total amount of aromatic dihydroxy compounds [III] and [IV] used. When a catalyst (a) selected from among alkali metal and alkaline earth metal compounds is used in these amounts, it is possible to maintain high polymerization activity and to obtain copolycarbonates having excellent hue, heat resistance, moisture resistance, and weatherability as well as excellent prolonged melt stability. If amounts in this range are used, the basicity shown by these compounds can be sufficiently neutralized or weakened by adding oxide compounds (to be described hereinbelow) in amounts that will not adversely affect the properties of the resulting copolycarbonates.

In the manufacturing method of the present invention, nitrogen-containing basic compounds (b) and/or borooxides (c) can be used in addition to (a) as the catalyst.

Examples of this type of nitrogen-containing basic compound (b) include those that degrade easily or are volatile at high temperatures, specific examples including compounds such as the following: ammonium hydroxides having alkyl, aryl, alkaryl [incomprehensible misspelling in Japanese text], or similar groups, for example, tetramethylammonium hydroxide (hereinbelow, $Me_4NOH$, where Me=methyl), tetraethylammonium hydroxide (hereinbelow, $Et_4NOH$, where Et=ethyl), tetrabutylammonium hydroxide (hereinbelow, $Bu_4NOH$, where Bu=butyl), and benzyltrimethylammoniumhydroxide ($\phi$—$CH_2(Me)_3NOH$, where $\phi$=phenyl); tertiary amines such as trimethylamine, triethylamine, dimethylbenzylamine, triphenylamine, trioctylamine, tridodecylamine, and trioctadecylamine; secondary amines described by $R_2NH$ (where R is, for example, an alkyl group such as methyl or ethyl or an aryl group such as phenyl or tolyl); primary amines described by $RNH_2$ (where R is defined as above); pyridines such as 4-dimethylaminopyridine, 4-diethylaminopyridine, and 4-pyrrolidinopyridine; imidazoles such as 2-methylimidazole, 2-phenylimidazole, and 2-dimethylaminoimidazole; ammonia; and basic salts such as tetramethylammonium borohydride ($Me_4NBH_4$), tetrabutylammonium borohydride ($Bu_4NBH_4$), tetrabutylammonium tetraphenyl borate ($Bu_4NBPh_4$), and tetramethylammonium tetraphenyl borate ($Me_4NBPh_4$). Preferred among these are tetraalkylammonium hydroxides, especially tetraalkylammonium hydroxides with few metallic impurities such as those used in electronics.

Nitrogen-containing compound (b) is used in amounts of preferably from $1\times10^{-6}$ to $1\times10^{-1}$ moles, more preferably from $1\times10^{-5}$ to $1\times10^{-2}$ moles, per mole of the total amount of aromatic dihydroxy compounds used. It is preferred for (b) to be used in such amounts because the transesterification and polymerization reactions proceed at a sufficient rate and yield copolycarbonates with excellent color tone, heat resistance, and moisture resistance.

A catalyst which is a combination of a catalyst (a) selected from among alkali metal and alkaline earth metal compounds and a nitrogen-containing basic compound (b) can contribute to the production, at high polymerization activity, of high-molecular-weight copolycarbonates with improved color tone, excellent transparency, and excellent resistance to heat and moisture.

Examples of the boric acid compound (c) include boric acid and boric acid esters. Boric acid esters described by the following general formula can be used.

$B(OR)_n(OH)_{3-n}$ (where R is an alkyl group such as ethyl or methyl or an aryl group such as phenyl, and n is 1, 2, or 3).

Specific examples of this type of boric acid ester include trimethyl borate, triethyl borate, tributyl borate, trihexyl borate, triheptyl borate, triphenyl borate, tritolyl borate, and trinaphthyl borate.

The boric acid compound (c) is used in amounts of preferably from $1\times10^{-8}$ to $1\times10^{-1}$ moles, more preferably from $1\times10^{-7}$ to $1\times10^{-2}$ moles, most preferably from $1\times10^{-6}$ to $1\times10^{-4}$ moles, per mole of the total amount of aromatic dihydroxy compounds used. It is preferred to use bode acid or boric acid ester (c) in these amounts because it is possible to obtain copolycarbonates which are less susceptible to reduction in molecular weight at high temperatures and which have excellent hue, heat resistance, and moisture resistance.

A three-component catalyst also containing a boric acid compound (c) can contribute to the production, at a high level of polymerization activity, of high-molecular-weight copolycarbonates which maintain good transparency, heat resistance, moisture resistance, and color tone, especially when large amounts of a catalyst (a) selected from among alkali metal and alkaline earth metal compounds and a nitrogen-containing basic compound (c) are used.

The polycondensation reaction for the aromatic dihydroxy compounds and carbonic acid diesters in the presence of a catalyst can be carried out under the same conditions as polycondensation reactions known in the art.

Specifically, in the first stage of the polycondensation reaction, the aromatic dihydroxy compounds and carbonic acid diester are reacted at usually 80°–250° C., preferably 100°–230° C., more preferably 120°–190° C., for usually 0–5 hr, preferably 0–4 hr, more preferably 0–3 hr, at ordinary pressure. Next, the pressure of the system is lowered as the temperature is raised, and the reaction is continued. Finally, the polycondensation reaction for the aromatic dihydroxy compound and carbonic acid diester is completed at a reduced pressure of no more than 5 mm Hg, preferably no more than 1 mm Hg, and temperature of 240°–320° C.

This type of polycondensation reaction may be conducted as a continuous or batch process, using a tank-type, tube-type, or column-type reactor.

The manufacturing method of the invention produces polymer with a much lower gel content than interfacial processes using phosgene, enabling uniform, stable branched polycarbonates to be obtained.

The manufacturing method for copolycarbonates of the invention is advantageous in that copolycarbonates can be manufactured more economically than with interfacial processes and that it is not necessary to use environmentally hazardous raw materials such as phosgene.

It is also preferred for the copolycarbonates of the invention to contain no more than 1 ppm of alkali metal and/or alkaline earth metal compounds, no more than 0.1 ppm of chlorine, and no more than 0.1 ppm of other metals.

If the copolycarbonates of the invention contain alkali metal and/or alkaline earth metal compounds, it is also preferred for them to contain an acidic compound.

The acidic compounds may be Lewis acids, Brønsted acids, or esters of acids containing sulfur atoms, provided that they are capable of neutralizing or weakening the residual alkali metal or alkaline earth metal compounds from the copolycarbonate manufacturing process.

It is preferred that the acidic compounds have a pKa of no more than 3 in 25° C. aqueous solution. Advantageously, acidic compounds showing these pKa values can neutralize (or weaken) the alkali metals or alkaline earth metals used as catalyst and stabilize the resultant copolycarbonates.

Specific examples of Lewis acid compounds include boric acid compounds such as zinc borate and boron phosphate, boric acid esters such as $B(OCH_3)_3$, $B(OEt)_3$, and $B(OPh)_3$ (where Et represents ethyl, and Ph represents phenyl); aluminum compounds such as aluminum stearate and aluminum silicate; zirconium compounds such as zirconium carbonate, zirconium alkoxide, and zirconium hydroxycarbonate; gallium compounds such as gallium phosphide and gallium antimonide; germanium compounds such as germanium oxide and organogermanium; tin compounds such as tetra- or hexaorganotin and $PhOSn(Bu)_2OSn(Bu)_2OPh$ (where Ph represents phenyl, and Bu represents butyl); antimony compounds such as antimony oxide and alkylantimony; bismuth compounds such as bismuth oxide and alkylbismuth; zinc compounds such as $(CH_3COO)_2Zn$ and zinc stearate; and titanium compounds such as alkoxytitanium and titanium oxide.

Specific examples of Brønsted acids include phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, and toluenesulfinic acid as well as sulfonic acid compounds such as benzenesulforde acid, p-toluenesulfinic acid, trifluoromethanesulfonic acid, and naphthalenesulfonic acid, sulfonated polystyrene, and methyl acrylate-sulfonated styrene copolymers.

Specific examples of esters of acids containing sulfur atoms are compounds in which the pKa of the acid residue is no more than 3, including dimethyl sulfate; diethyl sulfate; methyl, ethyl, butyl, octyl, or phenyl esters of p-toluenesulfonic acid; and methyl, ethyl, butyl, octyl, or phenyl esters of benzenesulfonic acid.

Among such acidic compounds, those containing sulfur atoms, phosphorus atoms, or the like are preferred, acidic compounds containing sulfur atoms being especially preferred.

The content of these acidic compounds should be such that they are able to naturalize, or weaken, the effects of alkaline compounds such as the alkali metal and alkaline earth metal compounds (a) which can remain in the copolycarbonates. To this end, the acidic compounds should be present in amounts of from 0.01 to 500 moles, preferably from 0.1 to 100 moles, more preferably from 0.1 to 50 moles, most preferably from 0.5 to 30 moles, per mole of the total amount of alkali metal and alkaline earth metal compounds (a) used. In particular, Lewis acids or Brønsted acids, the latter having a pKa larger than 3, should be used in amounts of preferably from 0.1 to 50 moles, more preferably from 0.1 to 30 moles. Brønsted acids having a pKa of no more than 3 or an ester of an acid containing sulfur atoms should be used in amounts of preferably from 0.1 to 15 moles, more preferably from 0.1 to 7 moles.

In certain cases, the copolycarbonates of the invention can contain from 5 to 1000 ppm of water, based on the polycarbonate, in addition to acidic substances. The addition of water in these amounts increases the efficiency with which the acidic compounds neutralize the catalyst, the dwell stability of the molten polymer, for example, thermal stability, and hue stability, and properties such as hue, transparency, moisture resistance, and weatherability.

The copolycarbonates of the invention can also contain epoxy compounds, which have at least one epoxy group per molecule. Specific examples of such epoxy compounds include epoxidized soybean oil, epoxidized linseed oil, phenyl glycidyl ether, allyl glycidyl ether, t-butylphenyl glycidyl ether, 3,4-epoxycyclohexylmethyl 3,4-epoxycyclohexanecarboxylate,3,4-epoxy-6-methylcyclohexylmethyl3, 4-epoxy-6 -methylcyclohexanecarboxylate, 2,3-epoxycylohexylmethyl 3,4 -epoxycyclohexanecarboxylate, 4-(3,4-epoxy-5-methylcyclohexyl)butyl 3,4 -epoxycyclohexanecarboxylate, 3,4-epoxycyclohexylethylene oxide, cyclohexylmethyl 3,4-epoxycyclohexanecarboxylate, 3,4-epoxy-6-methylcyclohexylmethyl 6 -methylcyclohexanecarboxylate, bisphenol-A diglycidyl ether, tetrabromobisphenol-A glycidyl ether, the diglycidyl ester of phthalic acid, the diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxyphthalate , epoxidized polybutadiene, 3,4-dimethyl-1,2-epoxycyclohexane, 3,5-dimethyl-1,2-epoxycylohexane, 3-methyl-5-t-butyl-1,2-epoxycyclohexane, octadecyl 2,2-dimethyl-3,4-epoxycyclohexanecarboxylate, n-butyl 2,2-dimethyl-3,4 -epoxycyclohexanecarboxylate, cyclohexyl 2-methyl-3,4-epoxycyclohexanecarboxylate, n-butyl 2-isopropyl-3,4-epoxy-5-methylcyclohexanecarboxylate, octadecyl 3,4 -epoxycyclohexanecarboxylate, 2-ethylhexyl 3',4'-epoxycyclohexanecarboxylate, 4,6-dimethyl-2,3-epoxycyclohexyl 3',4'-epoxycyclohexanecarboxylate, 4,5 -epoxytetrahydrophthalic anhydride, 3-t-butyl-4,5-epoxytetrahydrophthalic anhydride, diethyl 4,5-epoxy-cis-1,2-cyclohexanedicarboxylate, and di-n-butyl 3-t-butyl-4,5 -epoxy-cis-1,2-cyclohexanedicarboxylate. These epoxy compounds may be used singly or in combination.

The amount of the epoxy compounds to be used is not restricted, being usually from 0.0001 to 0.2 parts, preferably from 0.001 to 0.1 pans, per 100 parts, by weight, of copolycarbonate.

When the copolycarbonates of the invention contain epoxy compounds, the epoxy compounds will react with any of the above-described acidic compounds retained in the copolycarbonates, neutralizing even excess amounts of them and enabling copolycarbonates with excellent hue, transparency, moisture resistance, weatherability, and heat resistance to be obtained.

In addition to their excellent heat resistance, hue, transparency, moisture resistance, and weatherability, the copolycarbonates of the invention are able to provide copolycarbonate moldings with prolonged hue stability during use and are therefore suitable for various uses such as sheet, optical products such as lenses and optical disks, outdoor applications as in automobiles, as well as machinery housings; bottles; containers; and the like.

The acidic compounds and, when necessary, epoxy compounds can be added to the copolycarbonates by any method. The method by which the acidic compounds and, also as necessary, the epoxy compounds are added is not particularly restricted. For example, the acidic compounds and, as necessary, the epoxy compounds may be added to the copolycarbonate when it is in a molten state and then kneaded in. Or, acidic compounds and, as necessary, an epoxy compounds may be added to a copolycarbonate solution and stirred in.

More specifically, methods of adding the acidic and epoxy compounds include: adding the acidic compound and, as necessary, the epoxy compound separately or simultaneously directly to the copolycarbonate, i.e., the molten reaction product in the reactor or extruder obtained upon completion of the polycondensation reaction, and kneading; pelletizing the polycondensed copolycarbonate, feeding the pellets, the acidic compound, and, as necessary, the epoxy compound to a single- or twin-screw extruder, and melt-kneading them together; and preparing a suitable solution of the polycondensed copolycarbonate by dissolving it in methylene chloride, chloroform, toluene, tetrahydrofuran, or the like, adding the acidic compound and, as necessary, the epoxy compound separately or simultaneously, and then stirring.

The order in which the acid and epoxy compounds are added is not restricted: either may be added first.

In the above-described method, it is also preferred to subject copolycarbonates obtained by the above-described polycondensation reaction to a vacuum treatment after adding the acidic compounds and optional epoxy compounds in order to eliminate residual monomers and oligomers.

The apparatus for carrying out this vacuum treatment is not particularly restricted, examples being a reactor or an extruder with a pressure reducing device.

When a reactor is used, it may be either a vertical or horizontal tank-type reactor, a horizontal tank-type reactor being especially preferred.

A vacuum treatment conducted in this type of reactor should be performed at a pressure of from 0.05 to 750 mm Hg, preferably from 0.05 to 5 mm Hg.

It is preferred to conduct the vacuum treatment for from 10 sec to 15 min in an extruder and from 5 min to 3 hr in a reactor. It is also preferred to conduct the vacuum treatment at a temperature of from 240° to 350° C.

When the vacuum treatment is conducted in an extruder, a vented single-screw or twin-screw extruder can be used, enabling the copolycarbonate to be pelletized as the vacuum treatment is carried out.

In an extruder, the vacuum treatment is conducted at a pressure of from 1 to 750 mm Hg, preferably from 5 to 700 mm Hg.

Adding the acidic compound and, as necessary, the epoxy compound to the reaction product, i.e., the copolycarbonate, and then performing the vacuum treatment enables copolycarbonates with fewer residual monomers and oligomers to be obtained.

Compositions containing the copolycarbonates of the invention can be used in a wide range of applications. Provided that it does not detract from the object of the invention, such compositions may contain additives such as heat stabilizers, ultraviolet absorbers, parting agents, antistatic agents, slip agents, antiblocking agents, lubricants, anticlouding agents, dyes, pigments, natural oils, synthetic oils, waxes, organic fillers, and inorganic fillers.

Specific examples of such heat stabilizers include phenol-based stabilizers, organic thioether-based stabilizers, organic phosphorus-based stabilizers, hindered amine-based stabilizers, and epoxy-based stabilizers.

Examples of phenol-based stabilizers include n-octadecyl 3-(4-hydroxy-3',5' -di-t-butylphenyl)propionate, tetrakis [methylene 3-(3',5'-di-t-butyl-4 -hydroxyphenyl)propionate] methane, 1,1,3-tris(2-methyl-4-hydroxy-5 -t-butylphenyl)butane, distearyl (4-hydroxy-3-methyl-5-t-butyl)benzylmalonate, and 4-hydroxymethyl-2,6-di-t-butylphenol.

Examples of thioether-based stabilizers include dilauryl thiodipropionate, distearyl thiodipropionate, dimyristyl 3,3'-thiodipropionate, ditridecyl 3,3'-thiodipropionate, and pentaerythritol tetrakis(β-laurylthiopropionate).

Examples of phosphorus-based stabilizers include aryalkyl phosphites such as bis(2,4-di-t-butylphenyl)pentaerythrityl diphosphite, diphenyl decyl phosphite, diphenyl isooctyl phosphite, phenyl isooctyl phosphite, and 2-ethylhexyl diphenyl phosphite; trialkyl phosphites such as trimethyl phosphite, triethyl phosphite, tributyl phosphite, trioctyl phosphite, trinonyl phosphite, tridecyl phosphite, trioctadecyl phosphite, distearyl pentaerythrityl diphosphite, tris(2-chloroethyl) phosphite, and tris(2,3-dichloropropyl) phosphite; tricycloalkyl phosphites such as tricyclohexyl phosphite; triaryl phosphites such as triphenyl phosphite, tricresyl phosphite, tris(ethylphenyl) phosphite, tris(2,4-di-t-butylphenyl) phosphite, tris(nonylphenyl) phosphite, and tris(hydroxyphenyl) phosphite; trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2 -chloroethyl) phosphate, and tris(2,3-dichloropropyl) phosphate; tricycloalkyl phosphates such as tricylohexyl phosphate; and triaryl phosphates such as triphenyl phosphate, tricresyl phosphate, tris(nonylphenyl) phosphate, and 2-ethylphenyl diphenyl phosphate.

Examples of hindered amine-type stabilizers include bis(2,2,6,6-tetramethyl-4-piperidyl) sebacate, bis( 1,2,2,6,6-pentamethyl-4-piperidyl) sebacate, 1-[2-{3(3,5 -di-t-butyl-4-hydroxyphenyl)propionyloxy}ethyl]-4-{3-(3,5-di-t-butyl-4 -hydroxyphenyl)propionyloxy}-2,2,6,6-tetramethylpiperidine, 8-benzyl-7,7,9,9 -tetramethyl-3-octyl-1,2,3-triazaspiro[4,5]undecane-2,4-dione, 4-benzoyloxy-2,2,6,6-tetramethylpiperidine, bis(1,2,2,6,6-pentamethyl-4-piperidyl)-2-(3,5-di-t-butyl-4 -hydroxypiperidyl) 2-n-butylmalonate, and tetrakis(2,2,6,6-tetramethyl-4-piperidyl) 1,2,3,4-butanetetracarboxylate.

These additives may be used singly or in combination. The heat stabilizers may be used in solid or liquid form.

The heat stabilizers are used in amounts of usually from 0.001 to 5 parts, preferably from 0.005 to 0.5 parts, more preferably from 0.01 to 0.3 parts, per 100 parts, by weight, of copolycarbonate (A).

The ultraviolet absorbers are not particularly restricted, and any conventional one may be used, examples including salicylic acid ultraviolet absorbers, benzophenone ultraviolet absorbers, benzotriazole ultraviolet absorbers, and cyanoacrylate ultraviolet absorbers.

Specific examples of salicylic acid ultraviolet absorbers include phenyl salicylate and p-t-butylphenyl salicylate.

Specific examples of benzophenone ultraviolet absorbers include 2,4 -hydroxybenzophenone, 2-hydroxy-4-methoxybenzophenone, 2,2'-dihydroxy-4 -methoxybenzophenone, 2,2'-dihydroxy-4,4'-dimethoxybenzophenone, 2-hydroxy-4 -methoxy-2'-carboxybenzophenone, 2-hydroxy-4-methoxy-5-sulfobenzophenone trihydrate,2-hydroxy-4-n-octoxybenzophenone,2,2',4,4'-tetrahydroxybenzophenone, 4-dodecyloxy-2-hydroxybenzophenone, bis(5-benzoyl-4-hydroxy-2 -methoxyphenyl)methane, and 2-hydroxy-4-methoxybenzophenone-5-sulfonic acid.

Specific examples of benzotriazole ultraviolet absorbers include 2-(2'-hydroxy-5'-methylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole,2-(2'-hydroxy-3',5'-di-t-butylphenyl)-5-chlorobenzotriazole,2-(2'-hydroxy-5'-t-octylphenyl)benzotriazole, 2-(2'-hydroxy-3',5'-di-t-amylphenyl)benzotriazole, 2-[2'-hydroxy-3'-(3", 4", 5",6"-tetrahydrophthalimidomethyl)-5'-methylphenyl] benzotriazole, and 2,2'-methylenebis [4-(1,1,3,3-tetramethylbutyl)-6-(2H-benzotriazole-2-yl)phenol].

Examples of cyanoacrylate ultraviolet absorbers include 2-ethylhexyl 2 -cyano-3-diphenylacrylate and ethyl 2-cyano-3,3-diphenylacrylate.

These ultraviolet absorbers may be used singly or in combination.

The ultraviolet absorbers are used in amounts of usually from 0.001 to 5 parts, preferably from 0.005 to 1.0 parts, more preferably from 0.01 to 0.5 parts per 100 parts, by weight, of copolycarbonate (A).

There are no particular restrictions on parting agents; common ones may be used. Examples include hydrocarbon parting agents such as natural and synthetic paraffins, polyethylene waxes, and fluorocarbons; fatty acid parting agents, for example, higher fatty acids such as stearic acid and hydroxystearic acid and oxyfatty acids; fatty amide parting agents, for example, fatty amides such as stearamide and ethylenebisstearamide and alkylenebisfatty amides; alcohol parting agents, for example, aliphatic alcohols such as stearyl alcohol and cetyl alcohol, polyhydric alcohols, polyglycols, and polyglycerols; fatty acid ester parting agents, for example, aliphatic acid esters of lower alcohols such as butyl stearate and pentaerythritol tetrastearate, fatty acid esters of polyhydric alcohols, and fatty acid esters of polyglycols; and silicone parting agents such as silicone oil.

Parting agents may be used singly or in combination.

Parting agents are used in amounts of usually from 0.001 to 5 parts, preferably from 0.005 to 1 part, more preferably from 0.01 to 0.5 part, per 100 parts, by weight, of copolycarbonate (A).

Colorants may be pigments or dyes, inorganic or organic. Combinations of them may be used.

Examples of inorganic colorants include oxides such as titanium dioxide and red oxide; hydroxides such as alumina white; sulfides such as zinc sulfide; selenides; ferrocyanides such as Prussian blue; chromates such as zinc chromate and molybdenum red; sulfates such as barium sulfate; carbonates such as calcium carbonate; silicates such as ultramarine blue; phosphates such as manganese violet; carbons such as carbon black; and metal powder colorants such as bronze powder and aluminum powder.

Specific examples of organic colorants include nitroso compounds such as naphthol green B; nitro compounds such a naphthol yellow S; azo compounds such as lithol red, Bordeaux 10B, naphthol red, and chromophthal yellow; phthalocyanine compounds such as phthalocyanine blue and fast sky blue; and condensed polycyclic colorants such as indanthrone blue, quinacridone violet, and dioxazine violet.

These colorants are used in amounts of generally from $1\times 10^{-6}$ to 5 parts, preferably from $1\times 10^{-5}$ to 3 parts, more preferably from $1\times10^{-5}$ to 1 part, per 100 parts, by weight, of copolycarbonate (A).

As with the acidic compounds (B) and epoxy compounds (C), in the present invention, it is preferred to add the above-described additional additives, especially the heat stabilizers, to the copolycarbonate (A) during pelletization, after it has cooled down from the final reactor and is still in a molten state. This keeps the thermal history of the resultant copolycarbonate compounds brief during manufacturing. In addition, the presence of heat stabilizers suppresses thermal decomposition of the copolycarbonate compositions during reheating for extrusion molding, pelletizing, or the like.

Next, the present invention is described more concretely by means of working examples; however, the present invention is not limited by the examples.

The composition and properties of the copolycarbonates and compositions thereof obtained in the working examples were measured in the following manner.

1) Analysis of the Constituent Units of the Copolycarbonates

The constituent units derived from aromatic dihydroxy compounds in the resin and the proportions in which they were present were studied by $^{13}C$—NMR. The $^{13}C$—NMR measurement conditions were as follows:

Measurement apparatus: $^{13}C$—NMR GX-270 (Made by Nihon Denshi (KK))

Measurement solvent: $CDCl_3$

Reference material: $CDCl_3$ (77.00 ppm)

Sample preparation: 0.4 g of polymer was dissolved in 3 mL of $CDCl_3$.

Measurement conditions: 110 MHz, spectra sampled 30,000 times.

2) Limiting Viscosity [η]

Measured in methylene chloride (0.5 g/dL) at 20° C., using an Ubbelohde viscometer.

3) Yellow Index (YI)

Press sheets, 3 mm thick, were measured with a Nihon Denshoku Kogyo (KK) Color and Defference Meter ND-1001 DP, using the transmission method, and the resultant X, Y, and Z values were substituted in the following equation.

$$YI=(100/Y)\times(1.277X-1.060Z)$$

4) Light Transmittance

Measured in 3 mm-thick press sheets with a Nihon Denshoku Kogyo (KK) NDH-200.

5) Haze

Measured in 3 mm-thick press sheets with a Nihon Denshoku Kogyo (KK) NDH-200.

6) Melt Flow Rate (MFR)

Measured at 300° C. under a 1.2 kg load in accordance with JIS K-7210.

7) Blow Moldability

Moldability was ascertained by feeding resin melted in an extruder into molds and blow-molding bottles.

Example 1

(1) Manufacture of Copolycarbonate

Monocarboxylated bisphenol A [i.e., 2-(4-hydroxyphenyl)-2-(3'-carboxy-4'-hydroxyphenyl)propane] was obtained by carboxylating a potassium salt of bisphenol A with $CO_2$ gas and then purifying the product by recrystallizing it from toluene solvent. This monocarboxylated bisphenol A was esterified with an excess of diphenyl carbonate and then refined in a column to obtain 2-(4-hydroxyphenyl)-2-(3'-phenoxycarbonyl-4'-hydroxyphenyl)-propane with a purity of at least 99 percent (according to HPLC analysis).

0.44 kilomoles of bisphenol A (made by GE Plastics Japan (KK)), 1.3 moles of the 2-(4-hydroxyphenyl)-2-(3'-phenoxycarbonyl-4'-hydroxyphenyl)propane prepared above, and 0.46 kilomoles of diphenyl carbonate (made by Enii Co.) were charged to a 250 liter capacity tank-type stirrer, the air was replaced with nitrogen, and the components were melted at 140° C.

Next, the temperature of the melt was raised to 180° C., 0.11 mole of tetramethylammonium hydroxide and 0.00044 mole of sodium hydroxide ($1\times10^{-6}$ mole per mole of bisphenol A) were added as catalyst, and the mixture was stirred for 30 min.

Next, the temperature was raised to 210° C., while at the same time gradually lowering the pressure to 200 mm Hg. 30 min later, the temperature was raised to 240° C., while at the same time gradually lowering the pressure to 15 mm Hg. The temperature and pressure were maintained at uniform levels, and the amount of phenol distilled off was measured. Atmospheric pressure was restored with nitrogen when phenol ceased to be distilled off. The time required for the reaction was 1 hr. The limiting viscosity number [η] of the resultant reaction product was 0.15 dL/g.

Next, the pressure of the reaction product was raised with a gear pump, the reaction product was sent to a centrifugal thin-film evaporator, and the reaction was continued. The temperature and pressure of the centrifugal thin-film evaporator were controlled to 270° C. and 2 mm Hg, respectively. The reaction product was fed from the bottom of the evaporator at a rate of 40 kg/hr by means of a gear pump to a twin-shaft horizontal polymerization tank (L/D=3, stirring element rotational diameter 220 mm, capacity 80 liter), which was controlled at 290° C. and 0.2 mm Hg, and polymerized for a dwell time of 30 min.

$^{13}C$—NMR measurement revealed that the polymer thus obtained was copolycarbonate containing constituent units described by the following formulas Formula 10 and Formula 11 in a molar ratio of 99.7 to 0.3 as the components derived from aromatic dihydroxy compounds.

Formula 10 [V]

Formula 11 [VI]

Figure 1:
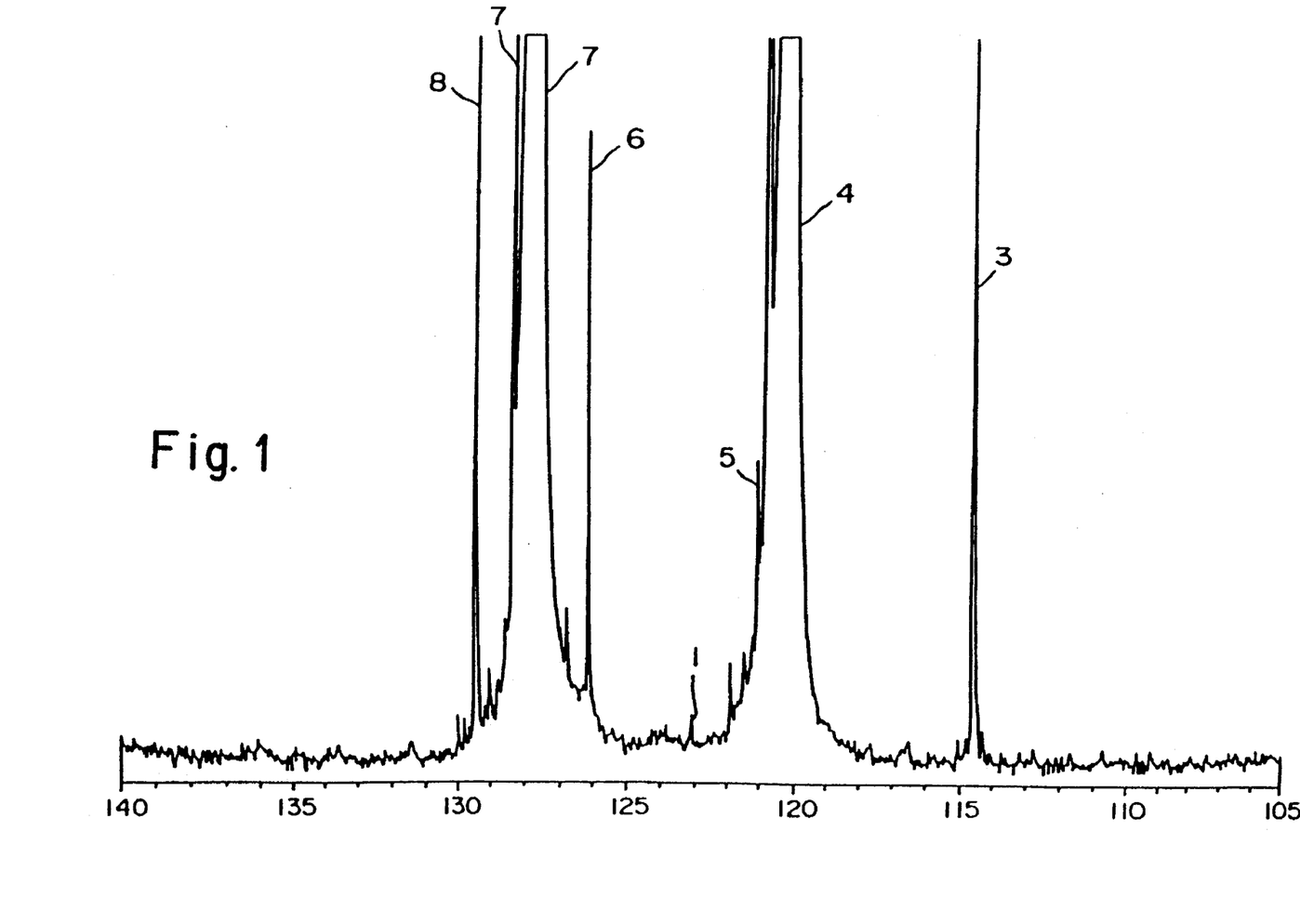
FIG. 1 is a chart showing the results of $^{13}C$—NMR analysis of the copolycarbonate manufactured in Example 1 over the range 105 to 140 ppm.
Figure 2:
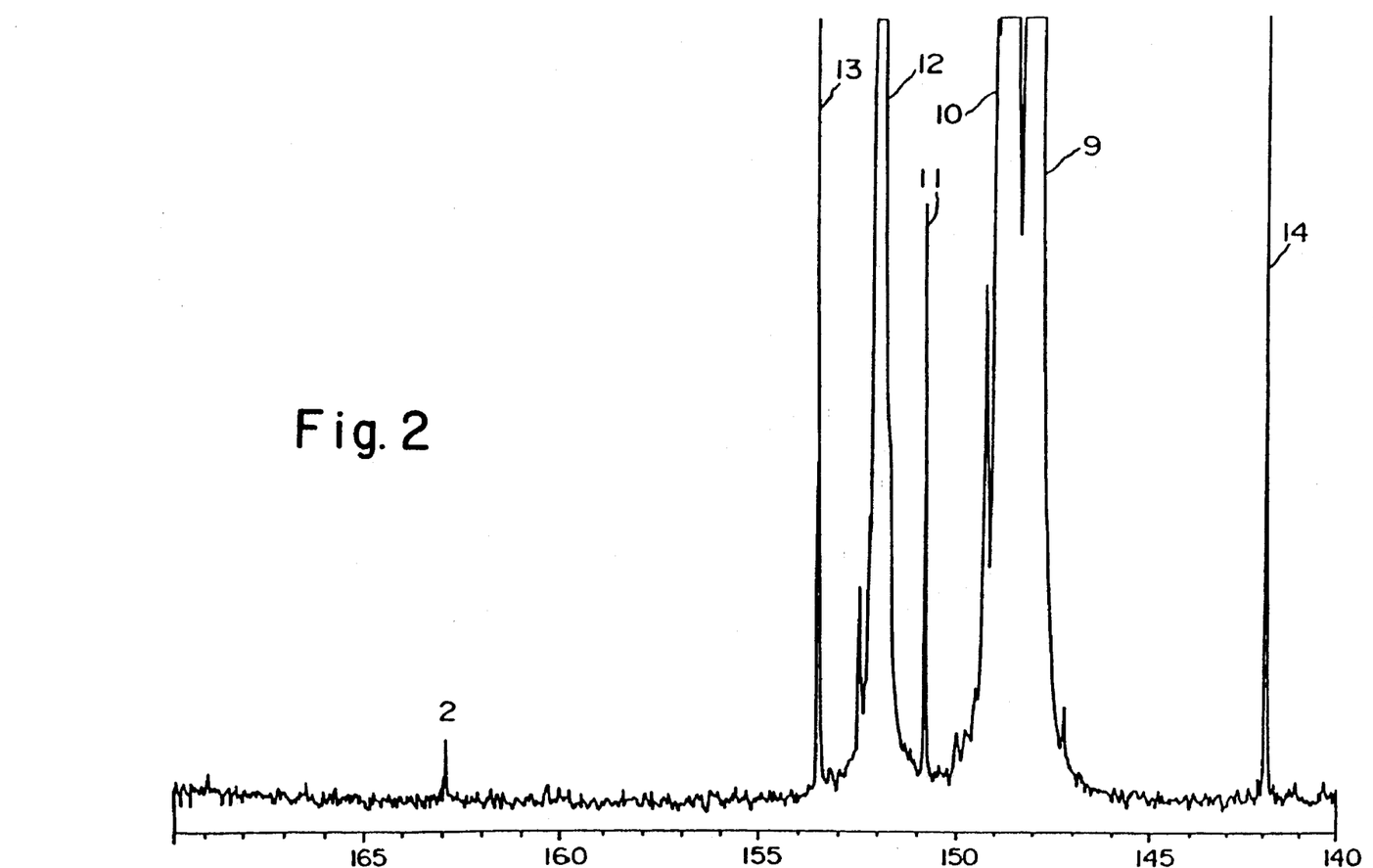
FIG. 2 is a chart showing the results of $^{13}C$—NMR analysis of the copolycarbonate manufactured in Example 1 over the range 140 to 170 ppm.
Figure 3:
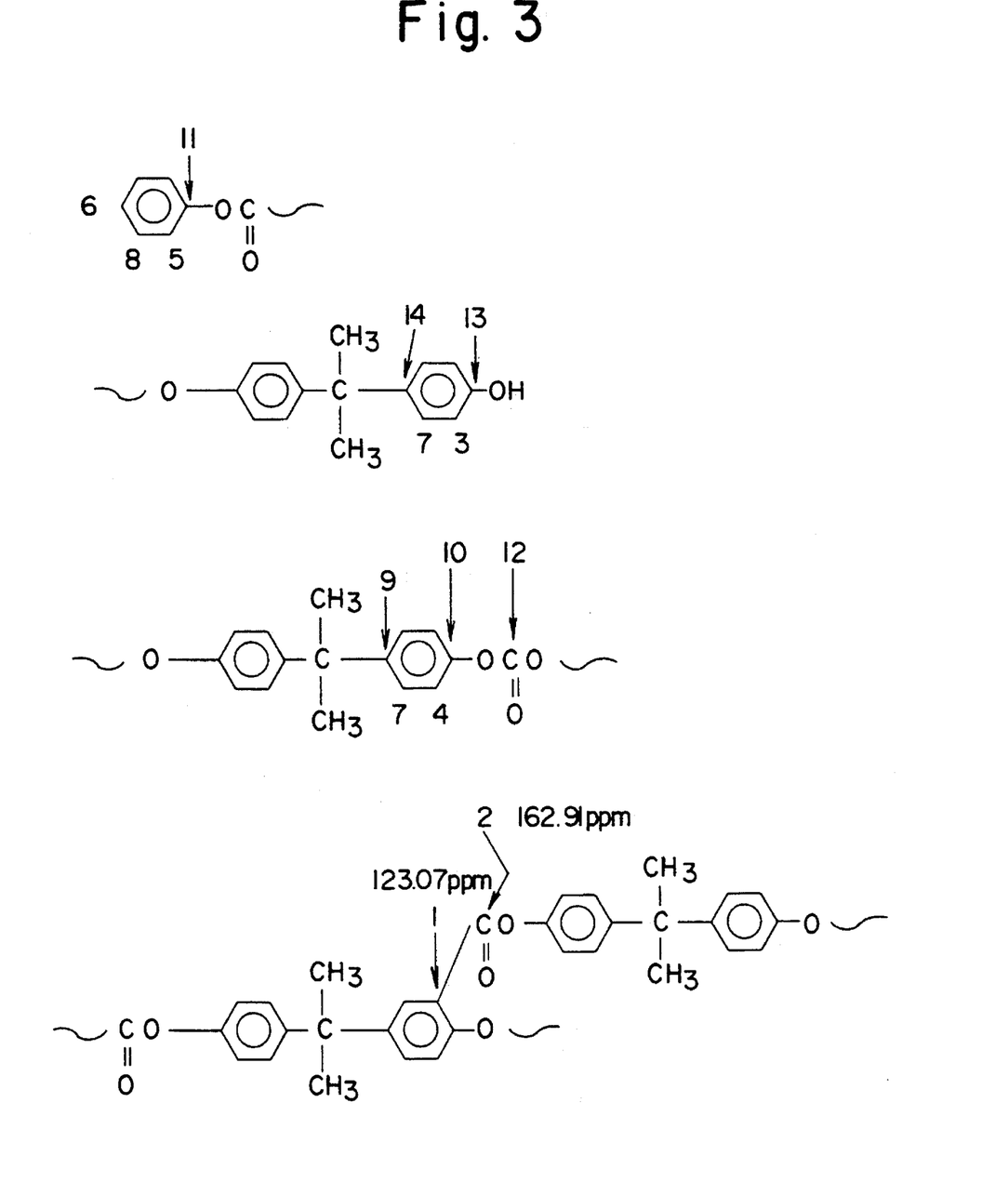
FIG. 3 shows the assignments for the peaks in the $^{13}C$—NMR spectra of the copolycarbonate manufactured in Example 1.

FIGS. 1 and 2 contain $^{13}C$—NMR charts. The peaks are identified in FIG. 3. Peaks ① and ② derived from carbon atoms were observed at 123.07 ppm and 162.91 ppm, respectively.

The limiting viscosity number [η] of this copolycarbonate was 0.49 dL/g.

(2) Addition of Additives

Next, this copolycarbonate was sent by means of a gear pump, still in a molten state, to a twin-screw extruder (L/D=17.5, barrel temperature 285° C.). 1.8 ppm of butyl p-toluenesulfonate and 50 ppm of distilled water, based on the copolycarbonate, were kneaded into the copolycarbonate, which was run through a die to form strands and cut with a cutter, forming pellets.

At this time the limiting viscosity number [η] was 0.49 dL/g.

The physical properties of the copolycarbonate are shown in Table 1.

Example 2

(1) Manufacture of Copolycarbonate

Copolycarbonate was manufactured in the same manner as in (1) of Example 1, except that bisphenol (A) and 2-(4-hydroxyphenyl)-2-(3'-phenoxycarbonyl-4'-hydroxyphenyl)propane were added in a molar ratio of 99.8 to 0.2.

$^{13}$C—NMR measurement of the polymer thus obtained revealed that it was copolycarbonate having constituent units described by the above-mentioned formulas (Formula 10) and (Formula 11) in a molar ratio of 99.8 to 0.2 as the components derived from the aromatic dihydroxy compound. Thus, according the results of $^{13}$C—NMR analysis, the intensities of the peaks at ① and ② (123.07 ppm and 162.91 ppm) in the $^{13}$C—NMR charts for this polymer were ⅔ that of the polymer manufactured in Example 1.

The limiting viscosity number [η] of this copolycarbonate was 0.49 dL/g.

(2) Addition of Additives

Next, additives were added to the copolycarbonate obtained above in the same manner as in (2) of Example 1, and the physical properties of the polymer were measured. The results are shown in Table 1.

Example 3

(1) Manufacture of Copolycarbonate

Copolycarbonate was manufactured in the same manner as in (1) of Example 1, except that bisphenol A and 2-(4-hydroxyphenyl)-2-(3'-phenoxycarbonyl-4'-hydroxyphenyl)-propane were added in the molar percentages shown in Table 1.

$^{13}$C—NMR measurement revealed that the polymer thus obtained was copolycarbonate with constituent units described by the above-mentioned (Formula 10) and (Formula 11) in a molar ratio of 99.9 to 0.1 as the components derived from the aromatic dihydroxy compound. Thus, the intensities of the peaks at ① and ② (123.07 ppm and 162.91 ppm) in the $^{13}$C—NMR charts for this polymer were ⅓ that of the polymer manufactured in Example 1.

The limiting viscosity number [η] of this copolycarbonate was 0.49 dL/g.

(2) Addition of Additives

Next, additives were added to the copolycarbonate obtained above in the same manner in (2) of Example (1), and the physical properties of the polymer were measured. The results are shown in Table 1.

Comparative Example 1

(1) Manufacture of Copolycarbonate

Copolycarbonate was manufactured in the same manner as in (1) of Example 1, except that 2-(4-hydroxyphenyl)-2-(3'-phenoxycarbonyl-4'-hydroxyphenyl)propane was not used.

$^{13}$C—NMR measurement revealed that the polymer thus obtained was a polycarbonate having only a unit derived from bisphenol A as the component derived from an aromatic dihydroxy compound. That is, peaks ① and ② (123.07 ppm and 162.91 ppm) in the $^{13}$C—NMR spectra for the polymer made in Example 1 were not observed in these results.

The limiting viscosity number [η] of this polycarbonate was 0.49 dL/g. (2) Addition of Additives Next, additives were added to the polycarbonate obtained above in the same manner as in (2) of Example 1, and the physical properties of the polymer were measured. The results are shown in Table 1.

TABLE 1

| | Example | | | Comparative Example |
|---|---|---|---|---|
| | 1 | 2 | 3 | 1 |
| Copolycarbonate composition*¹ | 99.7/0.3 | 99.8/0.2 | 99.9/0.1 | 100/0*³ |
| Limiting Viscosity No. [η] (dL/g) | 0.49 | 0.49 | 0.49 | 0.49 |
| Acidic compound (ppm)*² | 1.8 | 1.8 | 1.8 | 1.8 |
| Water (ppm)*² | 50 | 50 | 50 | 50 |
| Physical Properties | | | | |
| Limiting viscosity No. [η] (dL/g) | 0.49 | 0.49 | 0.49 | 0.49 |
| MFR (g/10 Min) | 3.5 | 4.5 | 5.5 | 10.3 |
| Hue (YI) | 1.3 | 1.3 | 1.4 | 1.3 |
| Light transmittance (%) | 90.8 | 90.8 | 90.7 | 90.8 |
| Haze | 0.2 | 0.2 | 0.2 | 0.2 |
| Blow moldability | Good | Good | Good | Drawdown Could not be molded. |

*¹Molar ratio of constituent units [V] and [VI] ([V]/[VI]).
*²Based on the copolycarbonate.
*³Polycarbonate instead of copolycarbonate in Comparative Example 1 only.

Example 4

The copolycarbonate manufactured in (1) of Example 1 was used to manufacture a composition in the following manner. Namely, pellets were obtained in the same manner as in (2) of Example 1, except that in addition to the 1.8 ppm of butyl p-toluenesulfonate and 50 ppm of distilled water added in Section (2) of Example 1,500 ppm of tris(2,4-di-t-butylphenyl) phosphite (Mark 2112, made by Adeka Argus Co.), 500 ppm of n-octadecyl 3-(4-hydroxy-3,5-di-t-butylphenyl)propionate (Mark A050, made by Adeka Argus Co.), 500 ppm of 3,4-epoxycyclohexylmethyl 3',4'-epoxycyclohexanecarboxylate (Celoxide 2021P, lo made by Daicel Chemical Co.), and 0.5 ppm of colorant (Plast Violet 8840, made by Bayer Co. ) were added.

The physical properties of the resultant composition were measured; the results are shown in Table 2.

Comparative Example 2

Pellets were obtained by manufacturing a composition in the same manner as in Example 4, except that the bisphenol A polycarbonate manufactured in Comparative Example 1 was used instead of a copolycarbonate.

The physical properties of the resultant composition were measured, and the results are shown in Table 2.

TABLE 2

|  | Example 4 | Comparative Example 2 |
|---|---|---|
| Polycarbonate or Copolycarbonate composition used.*[1] | 99.7/0.3 | 100/0 |
| Limiting viscosity No. [η] (dL/g) | 0.49 | 0.49 |
| Physical Properties of the Compositions |  |  |
| Limiting viscosity No. [η] (dL/g) | 0.49 | 0.49 |
| MRF (g/10 min) | 3.7 | 10.6 |
| Hue (YI) | 1.3 | 1.4 |
| Light transmittance (%) | 90.8 | 90.7 |
| Haze | 0.2 | 0.2 |
| Blow moldability | Good | Drawdown Could not be molded. |

*[1]Molar ratio of constituient units [V] and [VI] ([V]/[VI]).

We claim:

1. A copolycarbonate obtained by copolymerizing at least two aromatic dihydroxy compounds and a compound capable of introducing carbonate links wherein a component derived from one of the aromatic dihydroxy compounds is a constituent unit of the following formula [I]:

in this formula, X is $-(R^3-)C(-R^4)-$, $-C(=R^5)-$, $-O-$, $-S-$, $-SO-$, or $-SO_2-$ where $R^3$ and $R^4$ are monovalent hydrocarbon groups which may be substituted with hydrogen atoms or halogens, and $R^5$ is a bivalent hydrocarbon group which may be substituted with halogen; $R^1$ and $R^2$, which may be identical or different, are each a hydrocarbon group with from 1 to 10 carbon atoms which may be substituted with halogen or are a halogen atom; and m and n are independently integers ranging from 0 to 4 and representing the number of substituents and another component derived from one of the aromatic dihydroxy compounds is a constituent unit of the following formula [II]:

in this formula, Y is $-(R^{3'}-)C(-R^{4'})-$, $-C(=R^{5'})-$, $-O-$, $-S-$, $-SO-$, or $-SO_2-$ where $R^{3'}$ and $R^{4'}$ are monovalent hydrocarbon groups which may be substituted with hydrogen atoms or halogen, and $R^{5'}$ is a bivalent hydrocarbon group which may be substituted with halogen; $R^7$ and $R^8$, which may be identical or different, are each a hydrocarbon group with 1 to 10 carbon atoms which may be substituted with halogen or are a halogen atom; and p and q represent the number of substituents, with p being an integer ranging from 0 to 4 and q being an integer ranging from 0 to 3.

2. A copolycarbonate of claim 1 which contains from $8\times10^{-5}$ to $3\times10^{-2}$ moles of the constituent unit of formula [II] per mole of the constituent unit of formula [I] and wherein $R^3$ and $R^4$ are straight-chain, branched or cyclic monovalent hydrocarbon groups having from 1 to 15 carbon atoms which may be substituted with hydrogen atoms or halogen, $R^5$ is a straight-chain, branched, or cyclic bivalent hydrocarbon group with 1 to 15 carbon atoms which may be substituted with halogen, $R^{3'}$ and $R^{4'}$ are straight-chain, branched or cyclic monovalent hydrocarbon groups with from 1 to 15 carbon atoms which may be substituted with hydrogen atoms or halogen, and $R^{5'}$ is a straight-chain, branched or cyclic bivalent hydrocarbon group with from 1 to 15 carbon atoms which may be substituted with halogen.

3. A copolycarbonate of claim 1 wherein X in said formula [I] is a straight-chain or branched alkylene, and Y in said formula [II] is a straight-chain or branched alkylene.

4. A copolycarbonate of claim 1 containing no more than 1 ppm of alkali metal compound or alkaline earth metal compounds, no more than 0.1 ppm of chlorine, and no more than 0.1 ppm of other metals.

5. A copolycarbonate of claim 4, also containing an acidic compound in proportions of from 0.1 to 50 moles per mole of the total amount of alkali metal compounds and alkaline earth compounds used.

6. A copolycarbonate of claim 5, also containing an epoxy compound in proportions of from 0.001 to 0.1 parts per 100 parts, by weight, of copolycarbonate.

7. A copolycarbonate of claim 6, wherein the content of the acidic compound is from 0.1 to 7 moles per mole of the total amount of alkali metal compounds and alkaline earth metal compounds used.

8. A copolycarbonate of any of claims 5 wherein the acidic compounds are Brønsted acids, Lewis acids, or esters of acids containing sulfur atoms.

9. A copolycarbonate of claim 8, wherein the pKa of the acid containing sulfur atoms or the acid residues of its esters is no more than 3 in a 25° C. aqueous solution.

10. A method for making a branched copolycarbonate which comprises melt polycondensing a) an aromatic dihydroxy compound b) an aromatic dihydroxy compound where X is $-(R^{3'}-)C(-R^4)-$, $-C(=R^5)-$, $-O-$, $-S-$, $-SO-$, or $-SO_2-$, where $R^3$ and $R^4$ are monovalent hydrocarbon groups which may be substituted with hydrogen atoms or halogens, and $R^5$ is a bivalent hydrocarbon group which may be substituted with halogen; $R^1$ and $R^2$, which may be identical or different, are each a hydrocarbon group with from 1 to 10 carbon atoms which may be substituted with halogen or are a halogen atom; and m and n are independently integers ranging from 0 to 4 and representing the number of substituents; $R^6$ is a straight-chain, branched or cyclic hydrocarbon group with 1 to 20 carbon atoms which may be substituted by hydrogen atoms or halogen or is a halogen atom;

Y is $—(R^{3'}—)C(—R^{4'})—$, $—C(=R^{5'})—$, $—O—$, $—S—$, $—SO—$, or $—SO_2—$, $R^{3'}$ and $R^{4'}$ are monovalent hydrocarbon groups which may be substituted with hydrogen atoms or halogen, and $R^{5'}$ is a bivalent hydrocarbon group which may be substituted with halogen; $R^7$ and $R^8$, which may be identical or different, are each a hydrocarbon group with 1 to 10 carbon atoms which may be substituted with halogen or are a halogen atom; and p and q represent the number of substituents, with p being an integer ranging from 0 to 4 and q being an integer ranging from 0 to 3; and c) a carbonic acid diester in the presence of a catalyst selected from alkali metal compounds or alkaline earth metal compounds.

11. A method of claim 10 using a nitrogen-containing basic compound or a boric acid compound as the catalyst.

\* \* \* \* \*